(12) United States Patent
Zhao et al.

(10) Patent No.: US 11,651,522 B2
(45) Date of Patent: May 16, 2023

(54) ADAPTIVE CYCLE CONSISTENCY MULTIMODAL IMAGE CAPTIONING

(71) Applicant: International Business Machines Corporation, Armonk, NY (US)

(72) Inventors: Shiwan Zhao, Beijing (CN); Yi Ke Wu, Beijing (CN); Hao Kai Zhang, Harbin (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 16/923,142

(22) Filed: Jul. 8, 2020

(65) Prior Publication Data

US 2022/0012919 A1 Jan. 13, 2022

(51) Int. Cl.
*G06T 9/00* (2006.01)
*G06N 3/08* (2023.01)
*G06N 3/045* (2023.01)

(52) U.S. Cl.
CPC .............. *G06T 9/002* (2013.01); *G06N 3/045* (2023.01); *G06N 3/08* (2013.01)

(58) Field of Classification Search
CPC ........ G06T 9/002; G06N 3/0454; G06N 3/08; G06N 3/0445; G06N 5/003
See application file for complete search history.

(56) References Cited

U.S. PATENT DOCUMENTS 10,003,483 B1 6/2018 Migliori
11,151,334 B2 10/2021 Rezagholizadeh
2018/0143966 A1 5/2018 Lu
(Continued)

FOREIGN PATENT DOCUMENTS

CN 110166779 A * 8/2019 ........... H04N 19/132
WO 2017151757 A1 9/2017

OTHER PUBLICATIONS

Specia et al., "A Shared Task on Multimodal Machine Translation and Crosslingual Image Description", Proceedings of the First Conference on Machine Translation, vol. 2: Shared Task Papers, pp. 543-553, Berlin, Germany, Aug. 11-12, 2016, © 2016 Association for Computational Linguistics.
(Continued)

*Primary Examiner* — Qun Shen
(74) *Attorney, Agent, or Firm* — Randy Tejeda

(57) ABSTRACT

In an approach to improving the image captioning performance of low-resource languages by leveraging multimodal inputs, one or more computer processors encode an image utilizing an image encoder, wherein the image is contained within a triplet comprising the image, one or more high-resource captions, and one or more low-resource captions. The one or more computer processors generate one or more high-resource captions utilizing the encoded image and the triplet inputted into a high-resource decoder. The one or more computer processors encode the one or more generated high-resource captions utilizing a high-resource encoder. The one or more computer processors add adaptive cycle consistency constraints on a set of calculated attention weights associated the triplet. The one or more computer processors generate one or more low-resource captions by simultaneously inputting the encoded image, the encoded high-resource caption, and the triplet into a trained low-resource decoder.

20 Claims, 7 Drawing Sheets

(56) References Cited

U.S. PATENT DOCUMENTS

| | | | |
|---|---|---|---|
| 2018/0144208 | A1 | 5/2018 | Lu |
| 2018/0144248 | A1* | 5/2018 | Lu .......................... G06N 3/08 |
| 2018/0165554 | A1 | 6/2018 | Zhang |
| 2018/0322368 | A1 | 11/2018 | Zhang |
| 2019/0130221 | A1* | 5/2019 | Bose .................... G06N 3/0472 |
| 2019/0220691 | A1 | 7/2019 | Valpola |
| 2019/0286073 | A1* | 9/2019 | Hosseini-Asi ......... G06N 3/047 |
| 2019/0286931 | A1 | 9/2019 | Kim |
| 2020/0026960 | A1* | 1/2020 | Park .................... G06V 10/766 |
| 2020/0111194 | A1* | 4/2020 | Wang ................... G06N 3/0472 |
| 2021/0012486 | A1* | 1/2021 | Huang ..................... G06N 3/08 |
| 2021/0067735 | A1* | 3/2021 | Reda ....................... G06N 3/045 |
| 2021/0287430 | A1* | 9/2021 | Li ......................... G06F 18/217 |
| 2022/0014807 | A1 | 1/2022 | Lin |

OTHER PUBLICATIONS

Miyazaki et al., "Cross-Lingual Image Caption Generation", Proceedings of the 54th Annual Meeting of the Association for Computational Linguistics, pp. 1780-1790, Berlin, Germany, Aug. 7-12, 2016. © 2016 Association for Computational Linguistics.

Yun et al., "CutMix: Regularization Strategy to Train Strong Classifiers with Localizable Features", arXiv:1905.04899v1 [cs.CV] May 13, 2019, 14 pages.

Aldabbas et al., "Data Augmentation to Stabilize Image Caption Generation Models in Deep Learning" International Journal of Advanced Computer Science and Applications, vol. 10, No. 10, 2019, 9 pages.

Takahashi et al., "Data Augmentation using Random Image Cropping and Patching for Deep CNNs", Journal of Latex Class Files, vol. 14, No. 8, Aug. 2015, arXiv:1811.09030v2 [cs.CV] Aug. 27, 2019, 16 pages.

Liu et al., "Generating Diverse and Descriptive Image Captions Using Visual Paraphrases", Printed Jun. 17, 2020, 10 pages.

Jaffe, Alan, "Generating Image Descriptions using Multilingual Data", Proceedings of the Conference on Machine Translation (WMT), vol. 2: Shared Task Papers, pp. 458-464, Copenhagen, Denmark, Sep. 7-11, 2017, © 2017 Association for Computational Linguistics.

Dong et al., "I2T2I: Learning text to image synthesis with textual data augmentation", arXiv: 1703.06676v3 [cs.CV] Jun. 3, 2017, 6 pages.

Wang et al., "Image Captioning with Deep Bidirectional LSTMs", © 2016 ACM. ISBN 978-1-4503-3603-Jan. 16, 2010, embedarXiv:1604.00790v3 [cs.CV] Jul. 20, 2016, 11 pages, <http://dx.doi.org/10.1145/2964284.2964299>.

Summers et al., "Improved Mixed-Example Data Augmentation", arXiv:1805.11272v2 [cs.CV] Jun. 1, 2018, 7 pages.

Wu et al., "Improving Captioning for Low-Resource Languages by Cycle Consistency", arXiv:1908.07810v1 [cs CL] Aug. 21, 2019, 6 pages.

Cui et al., "Learning to Evaluate Image Captioning", Printed Jun. 17, 2020, 9 pages.

Shokri et al., "Membership Inference Attacks Against Machine Learning Models", arXiv:1610.05820v2 [cs.CR] Mar. 31, 2017, 16 pages.

Feng et al., "Unsupervised Image Captioning", arXiv:1811.10787v2 [cs.CV] Apr. 6, 2019, 10 pages.

Kim et al., "Variational Autoencoder-Based Multiple Image Captioning Using a Caption Attention Map", Appl. Sci. 2019, 9, 2699; doi:10.3390/app9132699, 12 pages, <http://www.mdpi.com/journal/applsci>.

Vincent et al., "Extracting and Composing Robust Features with Denoising Autoencoders", Appearing in Proceedings of the 25th International Confer-ence on Machine Learning, Helsinki, Finland, 2008, Copy-right 2008 by the author(s)/owner(s), 3 pages.

Vinyals et al., "Show and Tell: Neural Image Caption Generator", arXiv:1411.4555v2 [cs.CV] Apr. 20, 2015, 9 pages.

Wang et al., "Image Captioning with Deep Bidirectional LSTMs and Multi-Task Learning", Apr. 2018, 3 pages, <https://doi.org/10.1145/3115432>.

Appendix P—List of IBM Patents or Patent Applications Treated as Related, Filed herewith, 2 Pages.

Zhao et al., "Mixup Image Captioning", Filed herewith, 27 pages.

Zhao et al., "Denoising Autoencoder Image Captioning" Filed herewith, 25 pages.

Zhang et al., "Bag of Freebies for Training Object Detection Neural Networks", Apr. 12, 2019, arXiv:1902.04103v3 [cs.CV], 9 pages.

Zhang et al., "mixup: Beyond Empirical Risk Minimization", Published as a conference paper at ICLR 2018, Apr. 27, 2018, arXiv:1710.09412v2 [cs.LG], 13 pages.

* cited by examiner

| MODEL | CIDEr | BLEU4 | METEOR |
|---|---|---|---|
| Trans | 37.82 | 5.28 | 10.27 |
| Soft-Attn | 38.59 | 5.12 | 10.86 |
| Dual-Attn | 40.57 | 5.32 | 10.51 |
| Cycle-Attn | 41.91 | 5.67 | 10.59 |
| Dual-Attn+ | 42.91 | 5.54 | 10.79 |
| Cycle-Attn+ | 43.78 | 5.71 | 10.86 |

ADAPTIVE CYCLE CONSISTENCY MULTIMODAL IMAGE CAPTIONING

BACKGROUND

The present invention relates generally to the field of machine learning, and more particularly to image captioning.

Image captioning is the process of generating textual description of an image.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

Neural networks (NNs) are computing systems inspired by biological neural networks. NNs are not simply algorithms, but rather a framework for many different machine learning algorithms to work together and process complex data inputs. Such systems learn to perform tasks by considering examples, generally without being programmed with any task-specific rules. For example, in image recognition, NNs learn to identify images that contain cats by analyzing example images that are correctly labeled as true or false (e.g., cat or not cat) and using the results to identify objects (e.g., cats) in other images. In this example, NNs classify without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain where each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Convolutional neural networks (CNN) are a class of neural networks, most commonly applied to analyzing visual imagery. CNNs are regularized versions of a multi-layer perceptron (e.g., fully connected network), where each neuron in one layer is connected to all neurons in the next layer. CNNs take advantage of the hierarchical pattern in data and assemble more complex patterns using smaller and simpler patterns. CNNs break down images into small patches (e.g., 5×5 pixel patch), then moves across the image by a designated stride length. Therefore, on the scale of connectedness and complexity, CNNs are on the lower extreme as CNNs use relatively little pre-processing compared to other image classification algorithms, allowing the network to learn the filters that in traditional algorithms were hand-engineered.

SUMMARY

Embodiments of the present invention disclose a computer-implemented method, a computer program product, and a system for adaptive cycle consistency for multimodal image captioning. The computer-implemented method includes one or more computer processors encoding an image utilizing an image encoder, wherein the image is contained within a triplet comprising the image, one or more high-resource captions, and one or more low-resource captions. The one or more computer processors generate one or more high-resource captions utilizing the encoded image and the triplet inputted into a high-resource decoder. The one or more computer processors encode the one or more generated high-resource captions utilizing a high-resource encoder. The one or more computer processors add adaptive cycle consistency constraints on a set of calculated attention weights associated the triplet. The one or more computer processors generate one or more low-resource captions by simultaneously inputting the encoded image, the encoded high-resource caption, and the triplet into a trained low-resource decoder.

DETAILED DESCRIPTION

Figure 1:
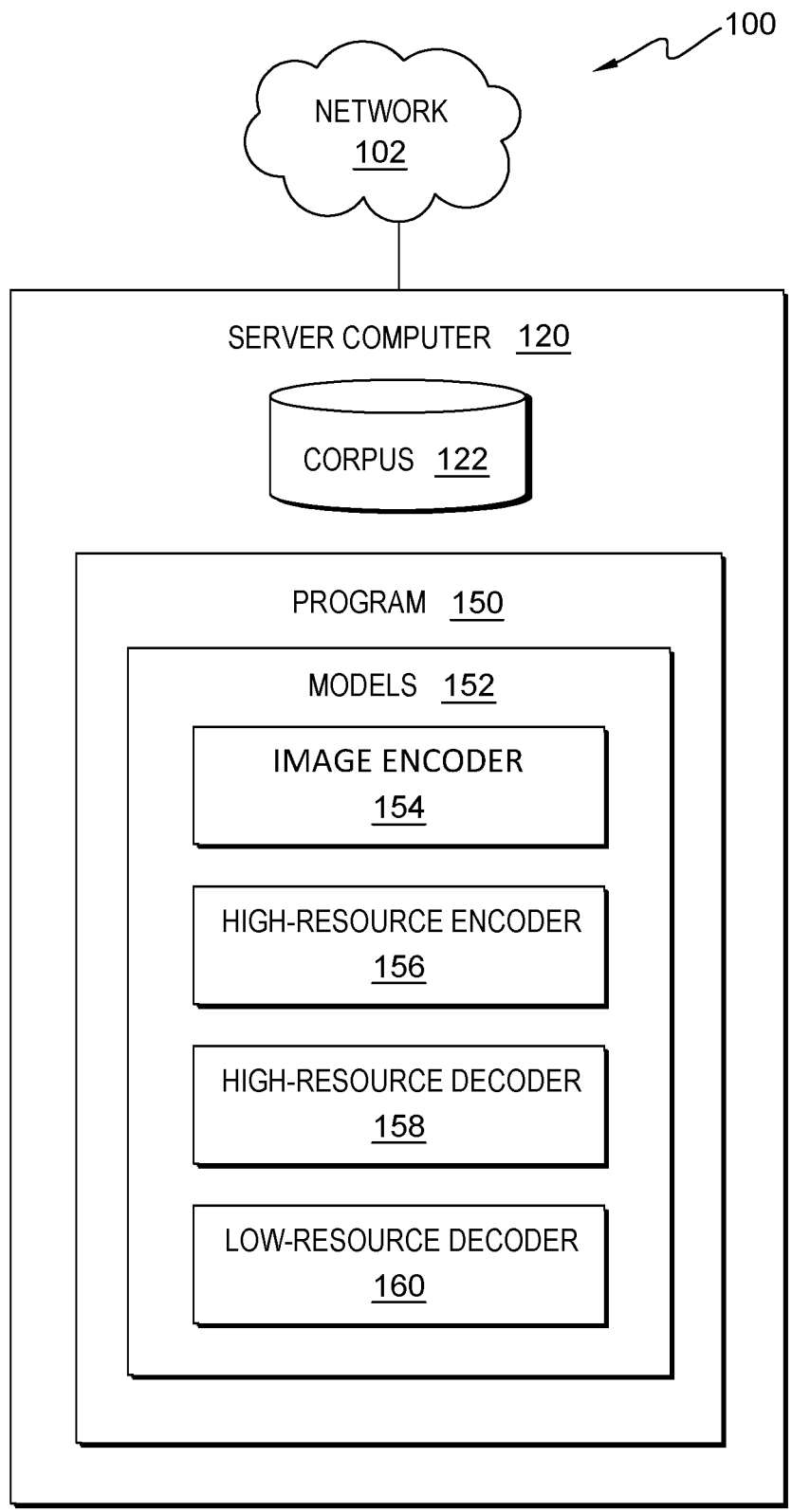
FIG. 1 is a functional block diagram illustrating a computational environment, in accordance with an embodiment of the present invention.

Traditionally, automatic image caption generation is a crucial and challenging task demanding both effective visual recognition and linguistic interpretation. Image caption generation models require substantial amounts of training data (e.g., exponentially increasing with problem complexity) to ensure model accuracy and precision dependent on number of classes, number of input features, and number of model parameters. Frequently said models assume there is sufficient training data, but in practice, there are many instances and situations where required training data is unavailable or prohibitively expensive. Traditionally, most caption datasets are collected in the English language, despite a strong need for image captioning in languages other than English. Although non-English caption datasets are collected, the scale of these datasets is relatively small (e.g., less than ⅓ of an high-resource dataset) compared to that of various English caption datasets, such languages are considered low-resource languages for the captioning. This issue is expounded with regards to low-resource languages or languages with limited training sets as compared to a high-resource language (e.g., large monolingual dataset). For example, a high-resource language may have a factor of 7.2 more datapoints than a low-resource language. In this example, any language that has a scale factor of at least 2 compared to another language (i.e., low-resource) is considered a high-resource language. Furthermore, low-resource languages suffer from low quality (i.e., inaccurate representations of an image where said representations do not conform with linguistic rules associated with the language) translations due to large disparities of data distribution between caption data and translation data.

Generally, a well-trained model should allow for generalization using training data to any data from a problem domain. Models trained with insufficient training data (i.e., low-resource languages) do not generalize and suffer from low accuracy and precision due to overfitting and underfitting. Traditionally, overfitting occurs when a model learns the detail and noise in the training data to an extent that it negatively impacts model performance with respect new data. Underfitted models neither accurately represent the training data nor generalize to new data. The cost of creating and maintaining a caption dataset is substantially higher than that of standard classification dataset, since annotating an image with a caption involves more complex cognitive and inferential efforts. Said cost is exponentially increased for infrequently utilized or uncommon languages where dataset scales are especially limited and lead to poor performing image captioning systems.

Embodiments of the present invention improve image captioning performance of low-resource languages by leveraging multimodal inputs. Embodiments of the present invention encode one or more images utilizing a trained CNN encoder. Embodiments of the present invention generate one or more high-resource natural language captions utilizing the encoded image fed into a trained RNN high-resource decoder. Embodiments of the present invention encode one or more generated high-resource natural language captions utilizing a trained RNN high-resource encoder. Embodiments of the present invention generate one or more low-resource captions leveraging the encoded image and one or more encoded generated high-resource captions inputted into a trained low-resource RNN decoder. Embodiments of the present invention apply adaptive cycle consistency to all inputs fed into each decoder, where adaptive attention is applied to each input. Embodiments of the present invention further add adaptive cycle consistency constraints on attentions of the triplet (i.e., input) and align the attentions associated with the trained decoders (i.e., image to low-resource language (i.e., words, sentences, captions, etc.), image to high-resource language, high-resource language to low-resource language). Embodiments of the present invention recognize that applying adaptive cycle consistency eases strict input requirements and alleviate language misalignment. Embodiments of the present invention add a sentential weight to assist in attention alignment. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes corpus 122 and program 150. In other embodiments, server computer 120 may contain other applications, databases, programs, etc. which have not been depicted in computational environment 100. Server computer 120 may include internal and external hardware components, as depicted and described in further detail with respect to FIG. 7.

Corpus 122 is a repository for data used by program 150. In the depicted embodiment, corpus 122 resides on server computer 120. In another embodiment, corpus 122 may reside elsewhere within computational environment 100 provided program 150 has access to corpus 122. A database is an organized collection of data. Corpus 122 can be implemented with any type of storage device capable of storing data and configuration files that can be accessed and utilized by program 150, such as a database server, a hard disk drive, or a flash memory. In an embodiment, corpus 122 includes a plurality of high-resource datasets and low-resource datasets. In an embodiment, high-resource datasets (e.g., languages) contain more datapoints than low-resource datasets. For example, a high-resource dataset has a factor of 7.2 more associated captions for each contained image as compared to a low-resource dataset associated with the same images. In this example, any language that has a scale factor of at least 2 as compared to another language (i.e., low-resource) is considered a high-resource language. In this embodiment, high-resource datasets contain sets of natural language captions capable of training highly effective models (i.e., high accuracy (e.g., model accuracy exceeding 90%), low overfitting (e.g., generalizable to new datasets without losing accuracy), etc.). In another embodiments, low-resource datasets contain sets of natural language captions incapable of training highly effective models (i.e., low accuracy, high overfitting, etc.), where additional natural language captions are prohibitively expensive or impossible to obtain. In an embodiment, corpus 122 stores and manages data used by program 150 such as training datasets that contain a plurality of training datapoints. In an embodiment, each datapoint is a triplet (i.e., multimodal) comprising image, high-resource caption, and a low-resource caption (e.g., targeted caption). For example, corpus 122 contains a training dataset of images with identified vehicles, associated feature vectors/mappings, associated high-resource captions, and associated low-resource captions. In various embodiments, corpus 122 includes a plurality of triplet inputs, each containing an image, one or more high-resource captions (i.e., caption from a high-resource language), and one or more low-resource captions (i.e., caption for a low-resource language). In other embodiments, a triplet contains an image, high-resource caption and a target low-resource caption, where the target low-resource caption is the intended output of the prevent invention leveraging the image and the high-resource caption.

Models 152 is representative of a plurality of models utilizing deep learning techniques to train, calculate weights, ingest inputs, and output a plurality of solution vectors. In an embodiment, models 152 is comprised of any combination of deep learning model, technique, and algorithm including transferrable neural networks algorithms and models such as recurrent neural network (RNN), long short-term memory (LSTM), deep stacking network (DSN), deep belief network (DBN), convolutional neural networks (CNN), and compound hierarchical deep models. In the depicted embodiment, models 152 contain image encoder 154, high-resource encoder 156, high-resource decoder 158, and low-resource decoder 160. Image encoder 154, high-resource encoder 156, high-resource decoder 158, and low-resource decoder 160 are each trained utilizing unsupervised training methods. In an embodiment, image encoder 154 is a CNN that encodes an input image into a plurality of feature vectors (e.g., scene segmentation, pixel recognition, and subsequent object identification (e.g., recognition)). In an embodiment, high-resource encoder 156 is an RNN with bidirectional gated recurrent units (GRU) and trained with a high-resource (e.g., capable of producing effective models) natural language dataset for extracting and embedding features from one or more generated high-resource natural language inputs. In an embodiment, high-resource decoder 158 is an RNN trained with a high-resource natural language dataset for generating one or more natural language captions based on an encoded image input. In an embodiment, low-resource decoder 160 is an RNN trained with a low-resource natural language dataset (e.g., incapable of producing effective models) for generating one or more natural language captions leveraging an encoded image input and encoded high-resource natural language input. The utilization of the models contained within models 152 is depicted and described in further detail with respect to FIG. 2.

Program 150 is a program for improving the image captioning performance of low-resource languages by leveraging multimodal inputs. In various embodiments, program 150 may implement the following steps: encode an image utilizing an image encoder, wherein the image is contained within a triplet comprising the image, one or more high-resource captions, and one or more low-resource captions; generate one or more high-resource captions utilizing the encoded image and the triplet inputted into a high-resource decoder; encode the one or more generated high-resource captions utilizing a high-resource encoder; add adaptive cycle consistency constraints on a set of calculated attention weights associated the triplet; generate one or more low-resource captions by simultaneously inputting the encoded image, the encoded high-resource caption, and the triplet into a trained low-resource decoder. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as corpus 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
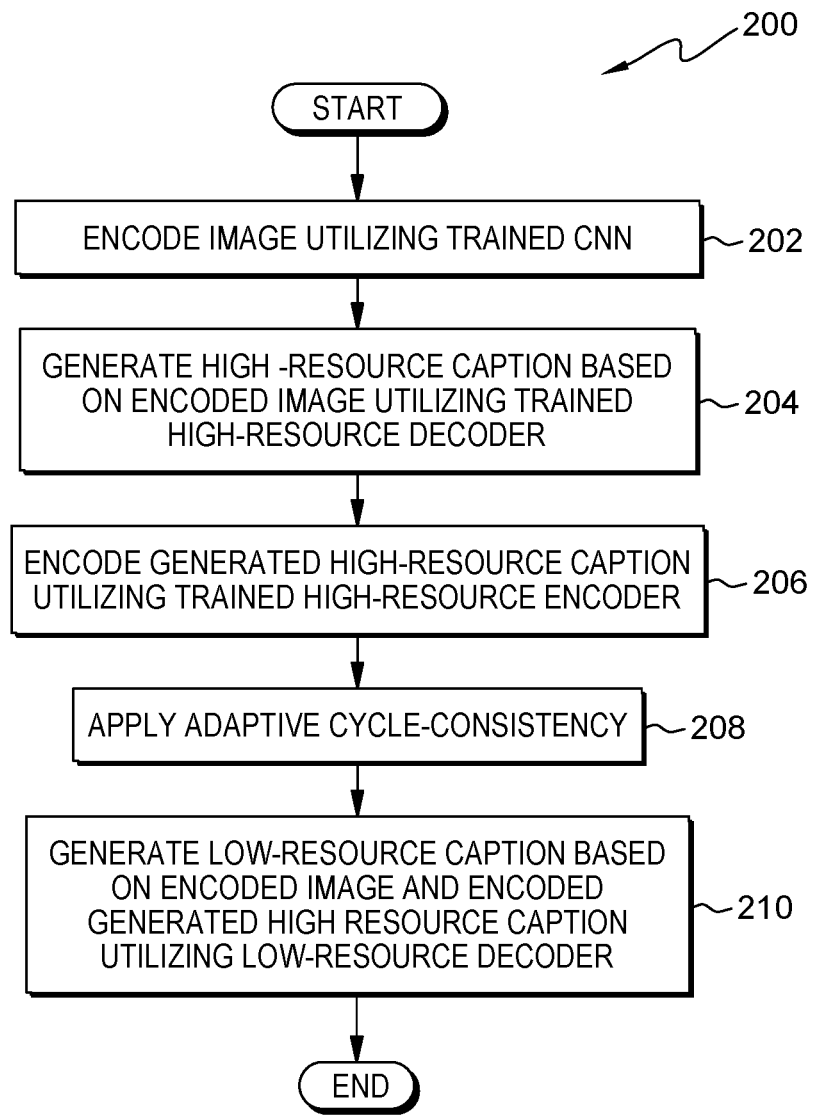
FIG. 2 is a flowchart depicting operational steps of a program, on a server computer within the computational environment of FIG. 1, for improving the image captioning performance of low-resource languages by leveraging multimodal inputs, in accordance with an embodiment of the present invention.

FIG. 2 is a flowchart depicting operational steps of program 150 for improving the image captioning performance of low-resource languages by leveraging multimodal inputs, in accordance with an embodiment of the present invention.

Program 150 encodes an input image utilizing a trained CNN (step 202). In an embodiment, program 150 initiates responsive to a detected corpus, a subsequent image captioning request (i.e., image to caption and targeted language for caption), or by user request (e.g., user inputs training set). In another embodiment, program 150 initiates responsively to a detected triplet input (i.e., image, high-resource caption, and targeted low-resource caption or low-resource caption to be improved). Program 150 encodes an image utilizing a trained CNN encoder. In an embodiment, program 150 utilizes a trained CNN encoder for scene convolution, segmentation, pixel recognition, and subsequent object identification (e.g., recognition) of a subsequent image. For example, program 150 trains the CNN to recognize boundaries associated with one or more objects within the image. In an embodiment, the trained CNN encoder has a convolution layer supported by an array of filters separating the input into multiple components. In another embodiment, program 150 utilizes the trained CNN encoder to generate a set of feature maps representative of the features contained the image. In an embodiment, program 150 extracts a set of features and calculates attention weights and context vector for each step.

Program 150 generates a high-resource caption based on the encoded image utilizing a trained high-resource decoder (step 204). Program 150 utilizes the encoded image from step 202 and associated generated feature maps as inputs for a trained high-resource decoder (i.e., natural language decoder), such as high-resource decoder 158. In the depicted embodiment, the high-resource decoder is an RNN trained utilizing unsupervised learning based on one or more training sets contained with a corpus such as corpus 122. In an embodiment, program 150 utilizes the trained high-resource decoder to generate one or more high-resource captions based on the encoded image and associated features. In this embodiment, program 150 utilizes the high-resource decoder to associate and map features from the encoded image to a natural language caption in a high-resource language. For example, program 150 utilizes an encoded image containing a plurality of vehicles as an input for an English trained decoder. Here, program 150 generates an English caption representing the features (e.g., identified objects) encoded in step 202. In an embodiment, program 150 utilizes a stack of recurrent units (i.e., RNN) to predict an output (i.e., caption or caption word) at a specific time step (i.e., caption position (e.g., sentence position)). In an embodiment, responsively, program 150 calculates one or more attention weights and context vector at each time step. In another embodiment, program 150 generates an output word probability set for each time step.

Program 150 encodes the generated high-resource caption utilizing a trained high-resource encoder (step 206). Program 150 encodes the generated high-resource caption, as described in step 204, into a high-resource vector representing the features contained in the generated high-resource caption. In an embodiment, program 150 creates one or more embeddings that contain syntactic and semantic word relationships associated with the generated high-resource caption. In this embodiment, program 150 utilizes the high-resource encoder to project the generated caption and component words into n-dimensional space where words with similar meanings occupy similar regions, for example, the closer two words are in n-dimensional space signifies that the words are contextually similar. In another example, program 150 utilizes a generated English (i.e., high-resource) caption, as described in step 204, as an input to an English (i.e., high-resource) encoder. In this example, program 150 utilizes the English encoder to create one or more vectors representing the features in the generated English caption. In another embodiment, program 150 utilizes the encoded generated high-resource caption to construct a pseudo-corpus and train a caption model for a low-resource language (i.e., caption) utilizing the constructed pseudo-corpus.

Program 150 applies adaptive cycle consistency (step 208). Program 150 applies adaptive cycle consistency constraints on a cycle of image regions, high-resource words, and low-resource words. In an embodiment, the trained high-resource decoder is fed an encoded image, creating a cycle, where multi-modal data is generated and encoded from a triplet input (i.e., an image, etc.) and funneled into a low-resource decoder. In various embodiments, program 150 applies adaptive cycle consistency constraints to a set of calculated attentions (e.g., weights) associated with one or more inputs (e.g., triplets or caption pairs (e.g., images and associated high-resource captions or translations)). In this embodiment, program 150 utilizes adaptive cycle consistency constraints to align attentions associated with inputs (e.g., specific words) fed into the decoders described herein (i.e., high-resource decoder, low-resource decoder). In an embodiment, program 150 utilizes equation 1 as a cycle consistency loss function:

$$\mathcal{L}_{cyc} = \|A^{de} - BA^{en}\|_2 \quad (1)$$

With respect to equation (1), $A^{de}$ is a matrix of size M×L, B is a matrix of size M×N, and $A^{en}$ is a matrix of size N×L.

In an embodiment, program 150 mitigates misaligned inputs, specifically with languages that have disparate language mappings. In this embodiment, program 150 utilizes the adaptive cycle consistency constraints on attention weights to correct language mappings and allow the decoder to generate accuracy low-resource captions. In an example, program 150 aligns inputs in the following situations: image to low-resource language decoding, image to high-resource language (i.e., caption) decoding, and high-resource language to low-resource language decoding. In an embodiment, program 150 introduces an alignment between image regions, high-resource captions, and low-resource captions through adaptive cycle consistency. For example, the image region containing an identified dog should correspond to the word "dog" in an English caption and word "perro" in a Spanish caption, simultaneously. In various embodiments, program 150 adds adaptive cycle consistency constraints on attention weights associated with a high-resource decoder conditioned on image regions, attention weights associated with a low-resource decoder conditioned on image regions, and another associated attention for the low-resource language decoder conditioned on generated high-resource captions. In various embodiments, program 150 utilizes attention weights to emphasize specific features and encoder states contained with one or more decoder inputs. In an embodiment, program 150 computes one or more attention weights for each of the embedded states contained within the encoded input.

In another embodiment, program 150 applies adaptive attention to one or more decoder inputs by calculating and adding a sentinel weight to a set of one or more attention weights. In this embodiment, the sentinel weight assists in mapping low-resource languages (e.g., Japanese) distant from a high-resource language (e.g., English), where said languages are difficult to align in a joint embedding space. In another embodiment, the sentinel weight provides a latent representation of the memory of the associated decoder (e.g., high-resource or low-resource). In this embodiment, program 150 utilizes the sentinel weight to determine (e.g., adjust associated attention weights) how much new information the decoder incorporates from the encoded image as opposed to generated high-resource captions when predicting the next word in a caption. For example, program 150 adjusts and utilizes a sentinel weight to learn when to focus (e.g., higher weight) and incorporate the encoded image more heavily than the encoded generated high-resource caption, for example the decoder utilizes the encoded image more than the encoded high-resource captions while generating the words "brown" and "dog". Responsively, program 150 calculates a context vector utilized by a decoder to predict the next word in a generating caption. Step 208 is further illustrated in FIG. 4.

Program 150 generates a low-resource caption based on the encoded image and the encoded generated high-resource caption utilizing a low-resource decoder (step 210). Program 150 generates one or more low-resource captions utilizing a trained RNN decoder that simultaneously incorporates the encoded image, as described in step 202, and the encoded high-resource generated caption, as described in step 204 and 206. In an embodiment, program 150 leverages said multi-modal data (i.e., encoded image and encoded generated caption) to generate one or more low-resource captions utilizing a low-resource decoder (e.g., low-resource decoder 160). For example, program 150 leverages an encoded image of a plurality of vehicles and an associated encoded generated English caption to generated one or more German (e.g., low-resource language) captions containing the features embedded in both encoded inputs. In an embodiment, program 150 concatenates the inputted multi-modal data and feeds merged vector to the decoder, generating a corresponding low-resource caption. In an embodiment, program 150 utilizes a stack of recurrent units (i.e., RNN) to predict an output (i.e., caption or caption word) at a specific time step (i.e., caption position (e.g., sentence position)). In an embodiment, responsively, program 150 calculates one or more attention weights and context vector at each time step. In another embodiment, program 150 generates a low-resource output word probability set for each time step.

Figure 3:
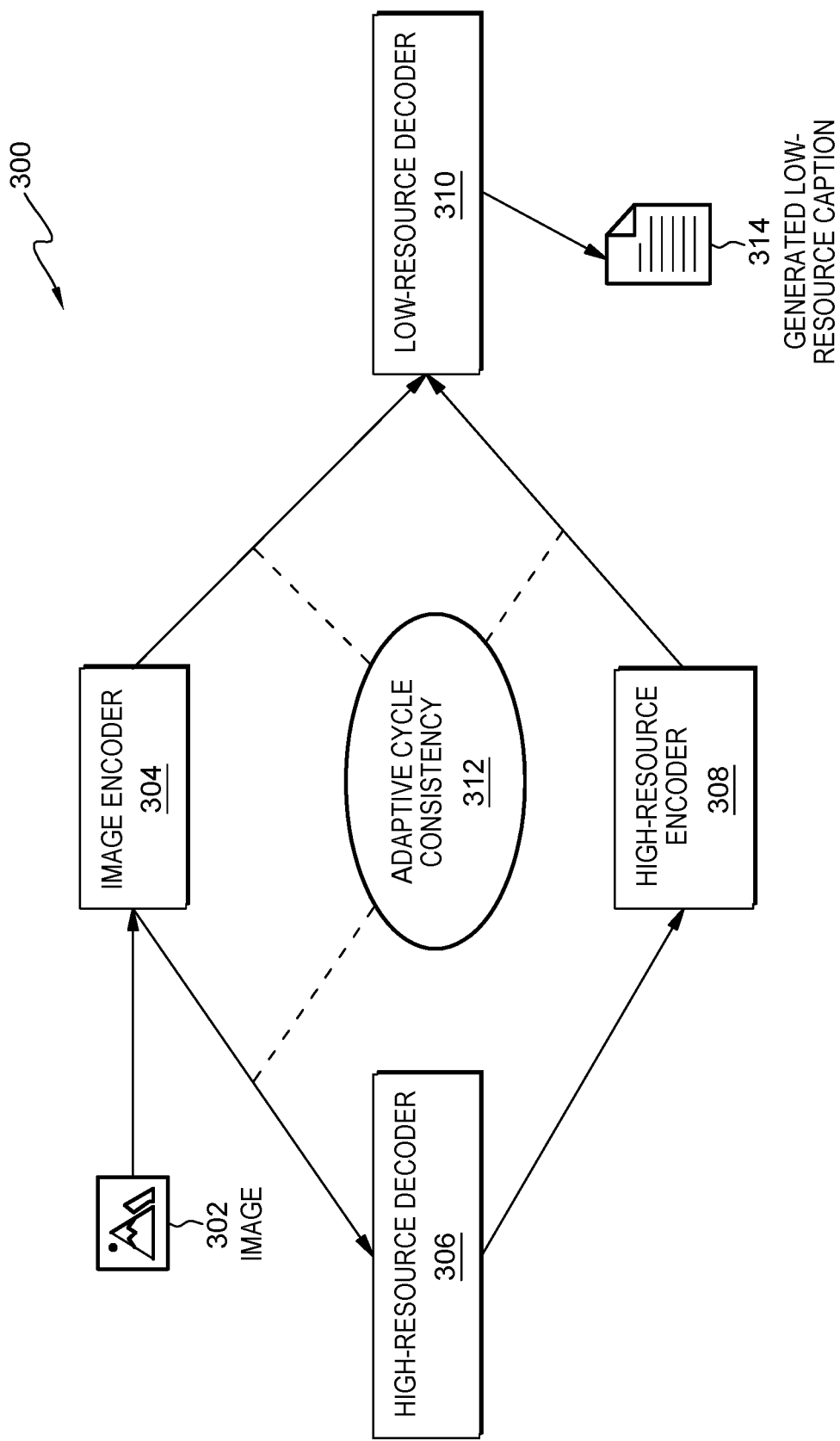
FIG. 3 illustrates operational steps of a program, for improving the image captioning performance of low-resource languages by leveraging multimodal inputs, within the computational environment of FIG. 1, in accordance with an embodiment of the present invention.

FIG. 3 illustrates operational steps of a program, for improving the image captioning performance of low-resource languages by leveraging multimodal inputs, within the computational environment of FIG. 1, in accordance with an embodiment of the present invention. FIG. 3 depicts image 302 being fed into image encoder 304 (e.g., image encoder 154). Image encoder 304 encodes image 302, as described in step 202, and feds the encoded image into high-resource decoder 306 (e.g., high-resource decoder 158). High-resource decoder utilizes the encoded version of image 302 to generate one or more high-resource captions which are subsequently fed into high-resource encoder 308 (e.g., high-resource encoder 156). High-resource encoder 308 encodes the generated high-resource captions and, along with the encoded version of image 302, are fed into low-resource decoder 310 (e.g., low-resource decoder 160). Program 150 applies adaptive cycle consistency constraints to align attentions associated with inputs fed into the high-resource decoder 306 and low-resource decoder 310. Low-resource decoder 310 simultaneously incorporates the encoded image and the encoded generated high-resource captions to create generated low-resource caption 314.

Figure 4:
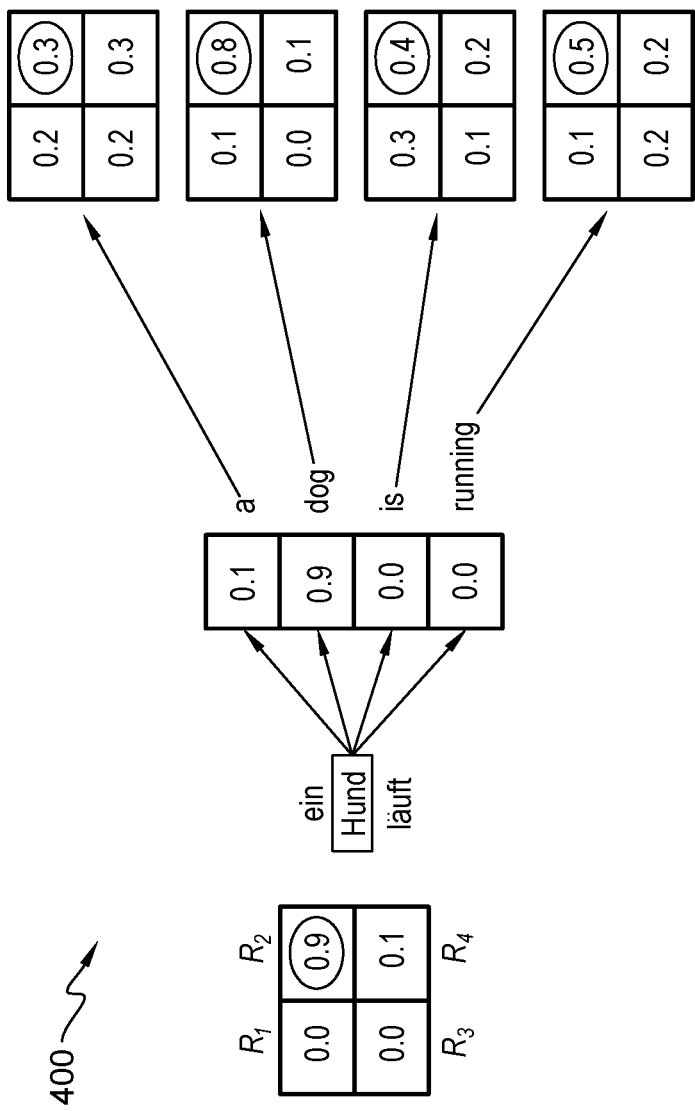
FIG. 4 illustrates operational steps of a program, for adaptive cycle consistency, within the computational environment of FIG. 1, in accordance with an embodiment of the present invention.

FIG. 4 illustrates operational steps of a program, for adaptive cycle consistency, within the computational environment of FIG. 1, in accordance with an embodiment of the present invention. FIG. 4 depicts an example of cycle consistency of image regions, English words, and German words. Here, program 150 assumes that the attention weights of "Hund" over the English words are (0.1; 0.9; 0.0; 0.0) in the word order of the sentence. For simplicity, FIG. 4 assumes that the image only has four regions $R_1$; $R_2$; $R_3$; $R_4$, and the attention weights of "Hund" over these regions are (0.0; 0.9; 0.0; 0.1). Similarly, each word in the English caption has a set of attention weights over said regions. Program 150 may utilize direct attention to calculate the attention weight of 0.9 for "Hund" on $R_2$. Alternatively, program 150 aggregates the attention weights on $R_2$ of every word in the English caption based on their relative importance on the generation of "Hund", resulting indirect attention weight of 0.75. In an embodiment, cycle consistency ensures that direct and indirect attention weights are similar. For a caption model, the more accurate the attention is, the more reasonable captions it generates, thus improving the quality of the low-resource language captioning by guaranteeing the cycle consistency.

Figure 5:
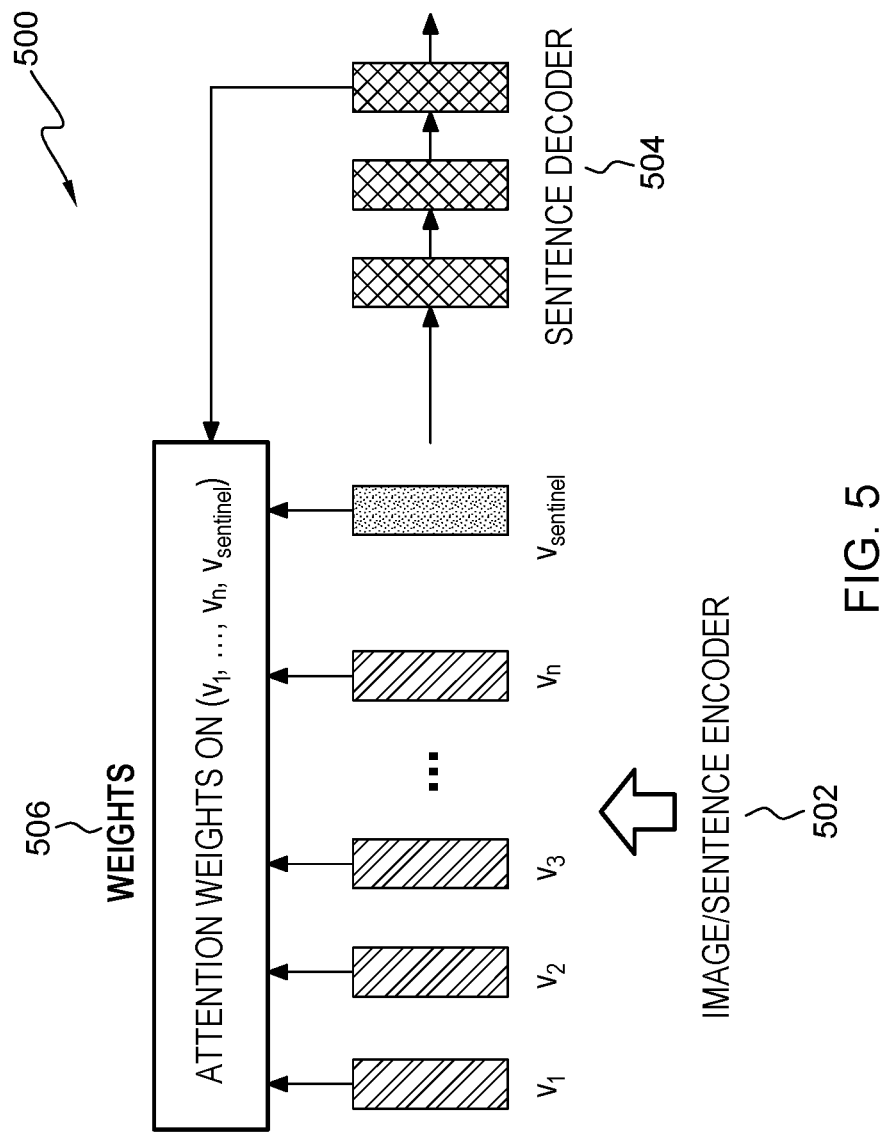
FIG. 5 is a functional block diagram depicting adaptive attention, within the computational environment of FIG. 1, in accordance with an embodiment of the present invention.

FIG. 5 is a functional block diagram depicting adaptive attention, within the computational environment of FIG. 1, in accordance with an embodiment of the present invention. FIG. 5 contains image/sentence encoder 502 (e.g., image encoder 154 and high-resource encoder 156), sentence decoder 504 (e.g., high-resource decoder 158 and low-resource decoder 160), and weights 506 (i.e., calculated attention weights and associated sentinel weight). FIG. 5 demonstrates applied adaptive attention as described in step 208.

Figure 6:
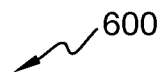
FIG. 6 depicts an exemplary table, in accordance with an embodiment of the present invention.

FIG. 6 depicts an exemplary Table 600, in accordance with an illustrative embodiment of the present invention. Table 600 contains testing results from a plurality of machine learning benchmarks such as bilingual evaluation understudy (BLEU-4), metric for evaluation of translation with explicit ordering (METEOR), consensus-based image description evaluation (CIDEr), where each benchmark evaluates a plurality of base line models along with the present invention (i.e., Cycle-Attn/Cycle-Attn+ (e.g., adaptive cycle consistency with one or more models trained with a high-resource dataset as described in FIG. 2)). Table 600 contains a pretrained a machine translation model (Trans), translating generated English captions into German directly; a trained soft attention caption model (Soft-Attn) based on images and corresponding direct German captions; a trained English caption model and a doubly-attentive model for generating German captions (Dual-Attn); a trained English caption model and a doubly-attentive model trained with a high-resource dataset (Dual-Attn+); and the present invention (Cycle-Attn) trained English high-resource datasets (Cycle-Attn+). Table 600 demonstrates that said model evaluation metrics, as described above, are significantly increased when utilizing an adaptive cycle consistency while leveraging multimodal inputs, as described in FIG. 2. Cycle-Attn outperforms both Soft-Attn and Trans in most metrics, particularly, Cycle-Attn outperforms Soft-Attn by +3.32 (8.60%) CIDEr, and +0.55 (10.74%) BLEU4. Table 600 demonstrates that the present invention improves low-resource language captioning by combining multi-modal inputs and associated feature sets. Additionally, Cycle-Attn achieves better performance on all metrics compared to Dual-Attn. For example, Cycle-Attn improves CIDEr by +1.34 (3.30%) and BLEU4 by +0.35 (6.58%), validating the effectiveness of the cycle consistency. Moreover, Cycle-Attn+ performs better than Dual-Attn+ on all metrics indicating that the present invention benefits from the cycle consistency and multi-modal dataset, simultaneously.

Figure 7:
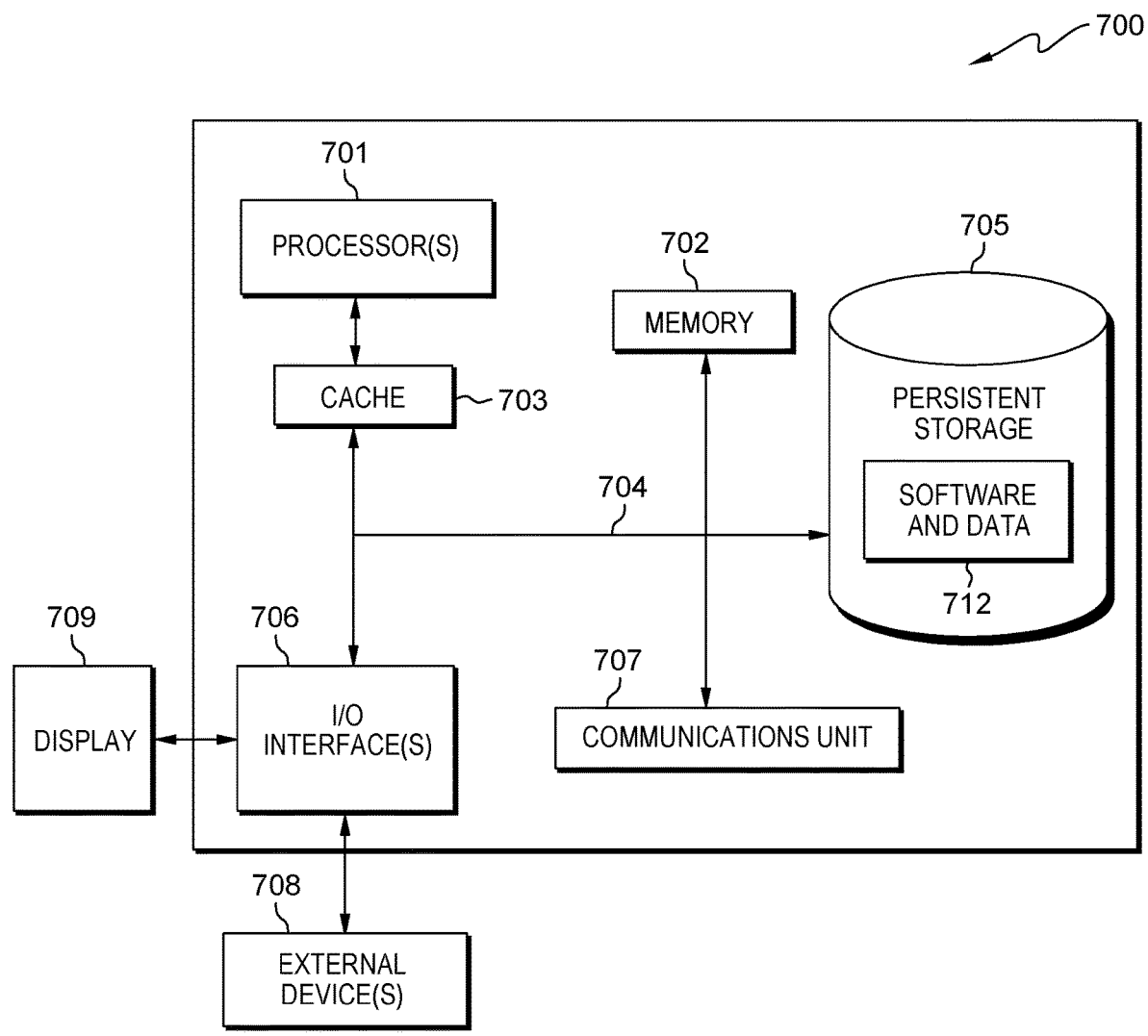
FIG. 7 is a block diagram of components of the server computer, in accordance with an embodiment of the present invention.

FIG. 7 depicts a block diagram of components of server computer 120 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Server computer 120 each include communications fabric 704, which provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications, and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of computer processor(s) 701 by holding recently accessed data, and data near accessed data, from memory 702.

Program 150 may be stored in persistent storage 705 and in memory 702 for execution by one or more of the respective computer processor(s) 701 via cache 703. In an embodiment, persistent storage 705 includes a magnetic hard disk drive. Alternatively, or in addition to a magnetic hard disk drive, persistent storage 705 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705. Software and data 712 can be stored in persistent storage 705 for access and/or execution by one or more of the respective processors 701 via cache 703.

Communications unit 707, in these examples, provides for communications with other data processing systems or devices. In these examples, communications unit 707 includes one or more network interface cards. Communications unit 707 may provide communications through the use of either or both physical and wireless communications links. Program 150 may be downloaded to persistent storage 705 through communications unit 707.

I/O interface(s) 706 allows for input and output of data with other devices that may be connected to server computer 120. For example, I/O interface(s) 706 may provide a connection to external device(s) 708, such as a keyboard, a keypad, a touch screen, and/or some other suitable input device. External devices 708 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 705 via I/O interface(s) 706. I/O interface(s) 706 also connect to a display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   encoding, by one or more computer processors, an image utilizing an image encoder, wherein the image is contained within a triplet comprising the image, one or more high-resource captions, and one or more low-resource captions;
   generating, by one or more computer processors, one or more high-resource captions utilizing the encoded image and the triplet inputted into a high-resource decoder;
   encoding, by one or more computer processors, the one or more generated high-resource captions utilizing a high-resource encoder;
   adding, by one or more computer processors, adaptive cycle consistency constraints on a set of calculated attention associated the triplet, wherein the added adaptive cycle consistency constraints align inputs between a cycle of (i) one or more image regions associated with the encoded image, (ii) high-resource captions, and (iii) low-resource captions; and
   generating, by one or more computer processors, one or more low-resource captions by simultaneously inputting the encoded image, the encoded high-resource caption, and the triplet into a trained low-resource decoder.

2. The method of claim 1, wherein adding adaptive cycle consistency constraints on attentions of the triplet, further comprises:
   aligning, by one or more computer processors, one or more attention weights associated with one or more triplets fed into a plurality of decoders.

3. The method of claim 2, wherein the plurality of decoders is associated with an image to low-resource caption decoding, an image to high-resource caption decoding, or a high-resource caption to low-resource caption decoding.

4. The method of claim 1, further comprising:
   adding, by one or more computer processors, a sentinel weight to the set of calculated attention weights associated with one or more triplets fed into a decoder, providing a latent representation of a memory of the decoder.

5. The method of claim 1, wherein the high-resource encoder and the high-resource decoder, and are each, respectively, a recurrent neural network.

6. The method of claim 1, wherein the low-resource decoder is an attention-based recurrent neural network trained with the one or more generated high-resource captions and associated low-resource translations.

7. The method of claim 1, wherein the image encoder is a trained convolutional neural network.

8. A computer program product comprising:
one or more computer readable storage media and program instructions stored on the one or more computer readable storage media, the stored program instructions comprising:
program instructions to encode an image utilizing an image encoder, wherein the image is contained within a triplet comprising the image, one or more high-resource captions, and one or more low-resource captions;
program instructions to generate one or more high-resource captions utilizing the encoded image and the triplet inputted into a high-resource decoder;
program instructions to encode the one or more generated high-resource captions utilizing a high-resource encoder;
program instructions to add adaptive cycle consistency constraints on a set of calculated attention weights associated the triplet, wherein the added adaptive cycle consistency constraints align inputs between a cycle of (i) one or more image regions associated with the encoded image, (ii) high-resource captions, and (iii) low-resource captions; and
program instructions to generate one or more low-resource captions by simultaneously inputting the encoded image, the encoded high-resource caption, and the triplet into a trained low-resource decoder.

9. The computer program product of claim 8, wherein the program instructions to add adaptive cycle consistency constraints on attentions of the triplet, further comprise:
program instructions to align one or more attention weights associated with one or more triplets fed into a plurality of decoders.

10. The computer program product of claim 8, wherein the plurality of decoders is associated with an image to low-resource caption decoding, an image to high-resource caption decoding, or a high-resource caption to low-resource caption decoding.

11. The computer program product of claim 8, wherein the program instructions, stored on the one or more computer readable storage media, further comprise:
program instructions to add a sentinel weight to the set of calculated attention weights associated with one or more triplets fed into a decoder, providing a latent representation of a memory of the decoder.

12. The computer program product of claim 8, wherein the high-resource encoder and the high-resource decoder, and are each, respectively, a recurrent neural network.

13. The computer program product of claim 8, wherein the low-resource decoder is an attention-based recurrent neural network trained with the one or more generated high-resource captions and associated low-resource translations.

14. The computer program product of claim 8, wherein the image encoder is a trained convolutional neural network.

15. A computer system comprising:
one or more computer processors;
one or more computer readable storage media; and
program instructions stored on the computer readable storage media for execution by at least one of the one or more processors, the stored program instructions comprising:
program instructions to encode an image utilizing an image encoder, wherein the image is contained within a triplet comprising the image, one or more high-resource captions, and one or more low-resource captions;
program instructions to generate one or more high-resource captions utilizing the encoded image and the triplet inputted into a high-resource decoder;
program instructions to encode the one or more generated high-resource captions utilizing a high-resource encoder;
program instructions to add adaptive cycle consistency constraints on a set of calculated attention weights associated the triplet, wherein the added adaptive cycle consistency constraints align inputs between a cycle of (i) one or more image regions associated with the encoded image, (ii) high-resource captions, and (iii) low-resource captions; and
program instructions to generate one or more low-resource captions by simultaneously inputting the encoded image, the encoded high-resource caption, and the triplet into a trained low-resource decoder.

16. The computer system of claim 15, wherein the program instructions to add adaptive cycle consistency constraints on attentions of the triplet, further comprise:
program instructions to align one or more attention weights associated with one or more triplets fed into a plurality of decoders.

17. The computer system of claim 15, wherein the plurality of decoders is associated with an image to low-resource caption decoding, an image to high-resource caption decoding, or a high-resource caption to low-resource caption decoding.

18. The computer system of claim 15, wherein the program instructions, stored on the one or more computer readable storage media, further comprise:
program instructions to add a sentinel weight to the set of calculated attention weights associated with one or more triplets fed into a decoder, providing a latent representation of a memory of the decoder.

19. The computer system of claim 15, wherein the high-resource encoder and the high-resource decoder, and are each, respectively, recurrent neural network.

20. The computer system of claim 15, wherein the low-resource decoder is an attention-based recurrent neural network trained with the one or more generated high-resource captions and associated low-resource translations.

* * * * *